United States Patent
Kim

(10) Patent No.: US 12,506,162 B2
(45) Date of Patent: Dec. 23, 2025

(54) DEVICE FOR MANUFACTURING MEMBRANE-ELECTRODE GASKET ASSEMBLY

(71) Applicants: HYUNDAI MOTOR COMPANY, Seoul (KR); Kia Corporation, Seoul (KR)

(72) Inventor: Chang Sik Kim, Yongin-si (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 723 days.

(21) Appl. No.: 17/463,672

(22) Filed: Sep. 1, 2021

(65) Prior Publication Data

US 2022/0285700 A1    Sep. 8, 2022

(30) Foreign Application Priority Data

Mar. 5, 2021   (KR) .................. 10-2021-0029677

(51) Int. Cl.
   *H01M 8/0273*   (2016.01)
   *H01M 8/0286*   (2016.01)
   *H01M 8/1004*   (2016.01)

(52) U.S. Cl.
   CPC ....... *H01M 8/0273* (2013.01); *H01M 8/0286* (2013.01); *H01M 8/1004* (2013.01)

(58) Field of Classification Search
   None
   See application file for complete search history.

(56) References Cited

U.S. PATENT DOCUMENTS

| 8,288,059 B2 | 10/2012 | Pierpont et al. |
| 8,609,296 B2 | 12/2013 | Pierpont et al. |

(Continued)

FOREIGN PATENT DOCUMENTS

| CN | 101558522 A | 10/2009 |
| CN | 101682051 A | 3/2010 |

(Continued)

OTHER PUBLICATIONS

Extended European search report issued on Feb. 28, 2022, in counterpart European Patent Application No. 21196608.0 (11 pages in English).

(Continued)

*Primary Examiner* — Alix E Eggerding
(74) *Attorney, Agent, or Firm* — MORGAN, LEWIS & BOCKIUS LLP

(57) ABSTRACT

Disclosed is a device for manufacturing a membrane-electrode gasket assembly, the device including a first sub-assembly configured to manufacture a membrane-electrode body having a membrane and an electrode catalyst being joined to each other, a second sub-assembly provided downstream from the first sub-assembly and being configured to receive the membrane-electrode body from the first sub-assembly, and a third sub-assembly provided downstream from the second sub-assembly, the third sub-assembly being configured to receive the membrane-electrode body from the second sub-assembly and to manufacture an assembly by joining a gasket to the membrane-electrode joined body, wherein the membrane is disposed continuously over the first to third sub-assembly.

12 Claims, 2 Drawing Sheets

(56) References Cited

U.S. PATENT DOCUMENTS

| | | | |
|---|---|---|---|
| 8,747,796 | B2 | 6/2014 | Lee et al. |
| 10,118,374 | B2 | 11/2018 | Kang |
| 10,784,517 | B2 | 9/2020 | Lee |
| 10,897,048 | B2 | 1/2021 | Sousa et al. |
| 2008/0145712 | A1 | 6/2008 | Pierpont et al. |
| 2010/0167176 | A1* | 7/2010 | Kawai ............... H01M 4/8896 156/60 |
| 2011/0286910 | A1* | 11/2011 | Lee ..................... D04H 1/488 156/443 |
| 2012/0018564 | A1* | 1/2012 | Schmitz ............. B21C 47/003 242/419.8 |
| 2013/0004882 | A1 | 1/2013 | Pierpont et al. |
| 2017/0069927 | A1* | 3/2017 | Jeong ............... B32B 37/0053 |
| 2017/0259552 | A1* | 9/2017 | Kang .................... B32B 39/00 |
| 2018/0337410 | A1* | 11/2018 | Lee ..................... H01M 4/8896 |
| 2019/0245215 | A1 | 8/2019 | Sousa et al. |

FOREIGN PATENT DOCUMENTS

| | | |
|---|---|---|
| CN | 102361090 A | 2/2012 |
| CN | 102413957 A | 4/2012 |
| CN | 108963306 A | 12/2018 |
| CN | 110268568 A | 9/2019 |
| GB | 2555127 A | 4/2018 |
| JP | 2008311012 A | 12/2008 |
| JP | 2017162789 A | 9/2017 |
| KR | 10-2008-0071391 A | 8/2008 |
| KR | 10-2010-0116790 A | 11/2010 |
| KR | 10-2019-0076565 A | 7/2019 |
| KR | 10-2038886 B1 | 10/2019 |
| WO | 2019/125038 A1 | 6/2019 |

OTHER PUBLICATIONS

Korean Office Action issued on Dec. 26, 2022, in counterpart Korean Patent Application No. 10-2021-0029677 (6 pages in Korean).

Office Action dated Oct. 25, 2024, issued in corresponding Chinese Patent Application No. 202111163310.1 with an English translation.

* cited by examiner

DEVICE FOR MANUFACTURING MEMBRANE-ELECTRODE GASKET ASSEMBLY

CROSS-REFERENCE TO RELATED APPLICATION(S)

This application claims the benefit under 35 U.S.C. § 119 (a) of Korean Patent Application No. 10-2021-0029677, filed on Mar. 5, 2021, the entire contents of which are incorporated herein by reference for all purposes.

BACKGROUND

1. Field

The following description relates to a device for manufacturing a membrane-electrode gasket assembly and, more particularly, to a device for manufacturing a membrane-electrode gasket assembly for a fuel cell.

2. Description of Related Art

Membrane-electrode gasket assemblies have a structure in which a positive electrode catalyst layer and a negative electrode catalyst layer are applied to the respective surfaces of a membrane. A sub-gasket is joined to each of the positive electrode catalyst layer and the negative electrode catalyst layer. Such a membrane-electrode gasket assembly is used in a fuel cell that generates electricity through an electrochemical reaction between hydrogen and oxygen.

Meanwhile, according to the related art, in order to manufacture the membrane-electrode gasket assembly, it is required to i) manufacture a membrane-electrode joined body by applying a positive electrode catalyst layer and a negative electrode catalyst layer to the respective surfaces of a membrane and ii) join sub-gaskets to the respective surfaces of the membrane-electrode joined body.

However, according to the related art, the operation i) and the operation ii) are performed separately, and thus, there is a limitation in that continuity between processes is interrupted. Also, according to the related art, the operation i) and the operation ii) are performed separately, and thus, the membrane-electrode joined body is wound and stored after the operation i), and then, it is required to unwind the membrane-electrode joined body again during the operation ii). Accordingly, the membrane-electrode joined body or the like is damaged between the operation i) and the operation ii), and thus, there is also a limitation in that overall quality of the membrane-electrode gasket assembly is deteriorated.

SUMMARY

In one general aspect, there is provided device for manufacturing a membrane-electrode gasket assembly, the device including a first sub-assembly configured to manufacture a membrane-electrode body having a membrane and an electrode catalyst being joined to each other, a second sub-assembly provided downstream from the first sub-assembly and being configured to receive the membrane-electrode body from the first sub-assembly, and a third sub-assembly provided downstream from the second sub-assembly, the third sub-assembly being configured to receive the membrane-electrode body from the second sub-assembly and to manufacture an assembly by joining a gasket to the membrane-electrode joined body, wherein the membrane is disposed continuously over the first to third sub-assembly.

The first sub-assembly may include a membrane unwinder configured to supply a film to which the membrane is attached, a first film rewinder provided downstream from the membrane unwinder and being configured to collect the film from the membrane, a first slot die provided downstream from the first film rewinder and being configured to apply a first electrode catalyst to a surface of the membrane, and a first adsorption roller facing the first slot die and being configured to adsorb the membrane.

The first sub-assembly may include a first dryer configured to dry the membrane and the first electrode catalyst, wherein the first dryer comprises a first drying space provided downstream from the first adsorption roller and the membrane and the first electrode catalyst flow into the first drying space.

The first sub-assembly may include a first moving roller provided downstream from the first drying space and movable along a predetermined trajectory, and a first controller configured to control movement of the first moving roller.

The first sub-assembly may include a second slot die provided downstream from the first moving roller and being configured to apply a second electrode catalyst to the other surface of the membrane, and a second adsorption roller facing the second slot die and being configured to adsorb the membrane.

The first dryer may include a second drying space provided downstream from the second adsorption roller and the membrane, the first electrode catalyst, and the second electrode catalyst flow into the second drying space.

The first moving roller may be movable in a left-right direction.

The second sub-assembly may include a second moving roller movable along a predetermined trajectory, and a second controller configured to control movement of the second moving roller.

A plurality of second moving rollers are provided along a direction in which the membrane moves.

The second moving rollers may be movable in an up-down direction.

The second sub-assembly may include a second dryer configured to spray air for drying.

The third sub-assembly may include a heat-pressing part configured to heat or press the membrane-electrode body.

The third sub-assembly may include a gasket unwinder configured to supply a film on which a gasket is attached, a third film rewinder configured to collect the film from the gasket, a gasket cutter provided between the gasket unwinder and the third film rewinder and configured to cut the gasket, and an assembler provided downstream from the heat-pressing part, the assembler being configured to press and join the membrane-electrode body and the gasket.

The assembler may include a first joining member configured to press the membrane-electrode body and the gasket to form a first joined region in the membrane-electrode gasket assembly, and a second joining member configured to press the membrane-electrode body and the gasket so as to form a second joined region in the membrane-electrode gasket assembly, wherein the first joined region may be different from the second joined region.

A direction in which the membrane-electrode gasket assembly is conveyed may be referred to as a front-rear direction, the first joining member presses a front region or a rear region of the gasket.

The second joining member may press a left region or a right region of the gasket.

The heat-pressing part may include a first pressing roller that may face one surface of the membrane-electrode body, a second pressing roller that may face the first pressing roller with the membrane-electrode body therebetween, and a third pressing roller that may face the second pressing roller with the membrane-electrode body therebetween.

The second pressing roller may be disposed above the first pressing roller, and the third pressing roller may be disposed above the second pressing roller.

The heat-pressing part further may include a fourth pressing roller that may face the third pressing roller, a fifth pressing roller that may face the second pressing roller, and a sixth pressing roller that may face the first pressing roller.

The heat-pressing part may include a press member configured to move in an up-down direction and to press the membrane-electrode body.

Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
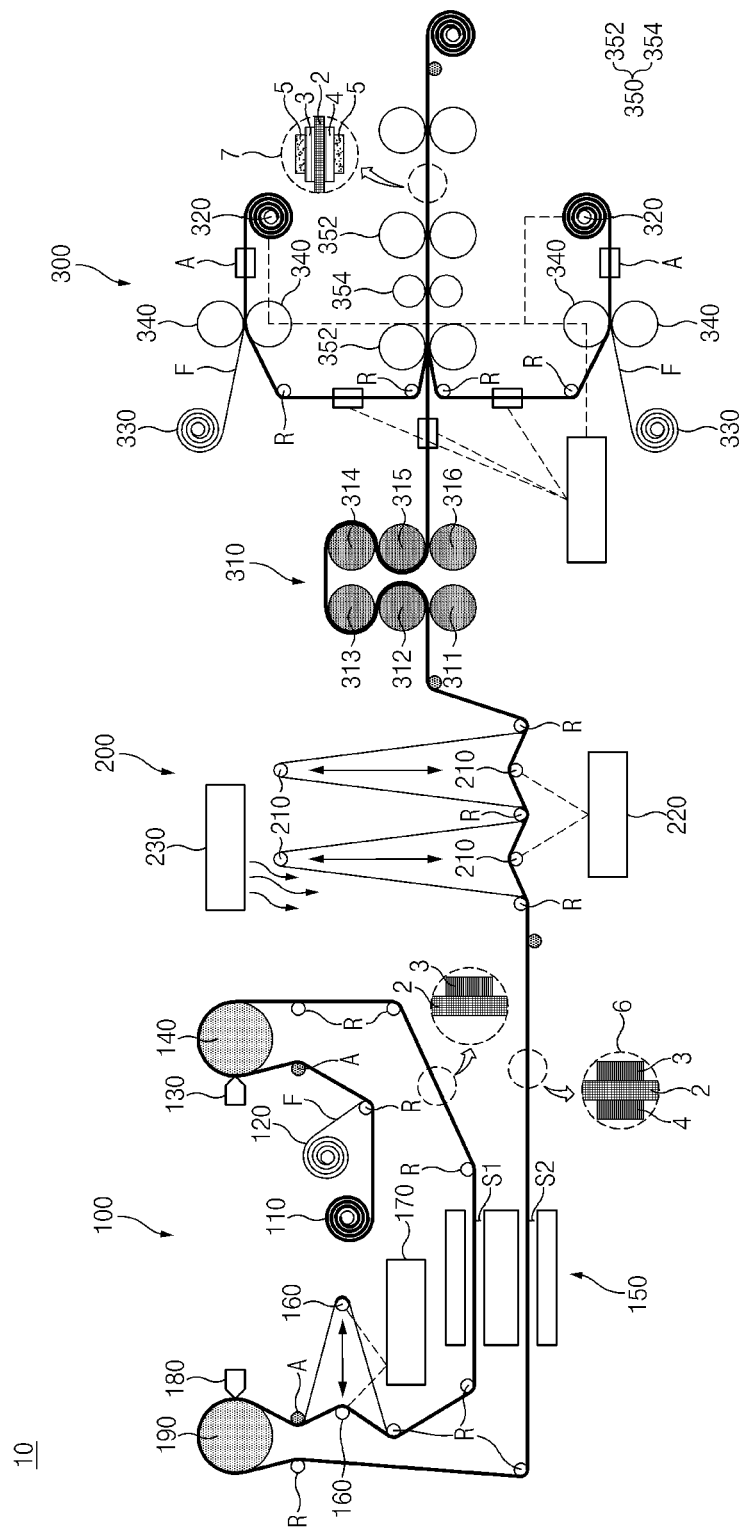
FIG. 1 is a view illustrating a device for manufacturing a membrane-electrode gasket assembly according to an exemplary embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

Throughout the specification, when a component is described as being "connected to" or "coupled to" another component, it may be directly "connected to" or "coupled to" the other component, or there may be one or more other components intervening therebetween. In contrast, when an element is described as being "directly connected to" or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in the examples described herein may also be referred to as a second member, component, region, layer, or section without departing from the teachings of the examples.

Hereinafter, a device for manufacturing a membrane-electrode gasket assembly according to the present disclosure will be described with reference to the drawings.

Device for Manufacturing Membrane-Electrode Gasket Assembly

FIG. 1 is a view illustrating a device for manufacturing a membrane-electrode gasket assembly according to the present disclosure.

As illustrated in FIG. 1, a device 10 for manufacturing a membrane-electrode gasket assembly (hereinafter, referred to as a 'manufacturing device') according to the present disclosure includes: a first sub-assembly 100 which manufactures a membrane-electrode joined body or membrane-electrode body 6 having a structure in which a membrane 2 and electrode catalysts 3 and 4 are joined to each other; a second sub-assembly 200 which is provided in a region downstream from the first sub-assembly 100 and receives the membrane-electrode joined body 6 from the first sub-assembly 100; and a third sub-assembly 300 which is provided in a region downstream from the second sub-assembly 200, and which receives the membrane-electrode joined body 6 from the second sub-assembly 200 and manufactures an assembly 7 by joining a gasket to the membrane-electrode joined body 6. Here, in the specification, the upstream region and the downstream region are defined with respect to a direction in which the membrane 2 is conveyed during a manufacturing process of the assembly. That is, according to the present disclosure, the membrane 2 passes, in this order, through the first sub-assembly 100, the second sub-assembly 200, and the third sub-assembly 300 during the manufacturing process of the assembly. Thus, the second sub-assembly 200 may be provided in a region downstream from the first sub-assembly 100, and the third sub-assembly 300 may be provided in a region downstream from the second sub-assembly 200.

Here, the according to the present disclosure, the first to third sub-assemblies 100, 200, and 300 may be provided such that the membrane 2 is disposed continuously over the first to third sub-assemblies 100, 200, and 300. That is, according to the present disclosure, a region of the membrane 2 provided in the first sub-assembly 100 and a region of the membrane 2 provided in the third sub-assembly 300 may be connected to each other by a region of the membrane 2 provided in the second sub-assembly 200.

As described above, in the manufacturing device 10 according to the present disclosure, the first sub-assembly 100 may be configured to manufacture the membrane-electrode joined body 6, and the third sub-assembly 300 may be configured to manufacture the assembly 7 in which a gasket 5 is attached to the membrane-electrode joined body 6. Thus, unlike the related art, a process of manufacturing the membrane-electrode joined body 6 and a process of manufacturing the assembly 7 may be integrally performed within a single device according to the present disclosure. Accordingly, not only may processes for manufacturing the assembly 7 be performed continuously, but also damages to the membrane-electrode joined body 6 may be minimized because a process for storing the membrane-electrode joined body 6 is not necessary prior to manufacturing the assembly 7. Hereinafter, the first to third sub-assemblies will be described with reference to the drawings.

The first sub-assembly 100 may include: a membrane unwinder 110 for supplying a film F to which the membrane 2 is attached; a first film rewinder 120 which is provided in a region downstream from the membrane unwinder 110 and collects the film F from the membrane 2; a first slot die 130 which is provided in a region downstream from the first film rewinder 120 and applies a first electrode catalyst 3 to one surface of the membrane 2; and a first adsorption roller 140 which faces the first slot die 130 and adsorbs the membrane 2. For example, the first electrode catalyst 3 may be a cathode catalyst. Also, the first adsorption roller 140 may adsorb the membrane 2 by creating a negative pressure therein. Also, the first slot die 130 may be controlled such that the first electrode catalyst 3 is discontinuously applied to the membrane 2, and thus, first electrode catalysts 3 are spaced a certain distance from each other.

Also, the first sub-assembly 100 may further include a first dryer 150 that dries the membrane 2 and the first electrode catalyst 3. That is, the first dryer 150 may be configured to dry the membrane 2 and the first electrode catalyst 3 after the first electrode catalyst 3 is applied to the membrane 2. For example, the first dryer 150 may perform a drying operation in a manner of applying hot air to the membrane 2 and the first electrode catalyst 3.

Here, according to the present disclosure, the first dryer 150 may have a first drying space S1 which is provided in a region downstream from the first adsorption roller 140 and into which the membrane 2 and the first electrode catalyst 3 flow. Thus, the membrane 2 and the first electrode catalyst 3 may be dried primarily while passing through the first drying space S1.

Meanwhile, the first sub-assembly 100 may further include: a first-first moving roller 160 provided in a region downstream from the first drying space S1 and movable along a predetermined trajectory; and a first-first controller 170 controlling movement of the first-first moving roller 160. For example, the first-first moving roller 160 may move in the left-right direction along a predetermined trajectory formed in the left-right direction, and the first-first controller 170 may control the left-right directional movement of the first-first moving roller 160.

According to the present disclosure, when the first-first moving roller 160 moves along the predetermined trajectory, a moving speed of the membrane 2 in the upstream region of the first-first moving roller 160 may be controlled to be different from a moving speed of the membrane 2 in the downstream region of the first-first moving roller 160. For example, in a case where the first-first moving roller 160 is provided as illustrated in FIG. 1, when the first-first moving roller 160 moves in the right direction, the length of the membrane 2 in the vicinity of the first-first moving roller 160 is increased. Thus, the moving speed of the membrane 2 in the downstream region of the first-first moving roller 160 becomes less than the moving speed of the membrane 2 in the upstream region of the first-first moving roller 160. On the other hand, when the first-first moving roller 160 moves in the left direction, the length of the membrane 2 in the vicinity of the first-first moving roller 160 is reduced. Thus, the moving speed of the membrane 2 in the downstream region of the first-first moving roller 160 becomes greater than the moving speed of the membrane 2 in the upstream region of the first-first moving roller 160. Thus, according to the present disclosure, the feed rate of the membrane 2 may be adjusted by controlling the movement of the first-first moving roller 160.

Continuing to refer to FIG. 1, the first sub-assembly 100 may further include: a second slot die 180 which is provided in a region downstream from the first-first moving roller 160 and applies a second electrode catalyst 4 to the other surface of the membrane 2; and a second adsorption roller 190 which faces the second slot die 180 and adsorbs the membrane 2. For example, the second electrode catalyst 4 may be an anode catalyst. Also, the second adsorption roller 190 may adsorb the membrane 2 by creating a negative pressure therein. Also, the second slot die 180 may be controlled such that the second electrode catalyst 4 is discontinuously applied to the membrane 2, and thus, second electrode catalysts 4 are spaced a certain distance from each other.

Here, as illustrated in FIG. 1, the first dryer 150 may have a second drying space S2 which is provided in a region downstream from the second adsorption roller 190 and into which the membrane 2, the first electrode catalyst 3, and the second electrode catalyst 4 flow. Thus, the membrane 2, the first electrode catalyst 3, and the second electrode catalyst 4 may be dried secondarily while passing through the second drying space S2. More preferably, the first drying space S1 and the second drying space S2 may be spaced apart from each other in the up-down direction. FIG. 1 illustrates, as one example, a state in which the first drying space S1 and the second drying space S2 are formed overlapping each other when the first dryer 150 is viewed from the above.

Meanwhile, according to the present disclosure, the first sub-assembly 100 may further include fixed rollers R which are respectively provided in a region in which the membrane 2 is separated from the film F, a region between the first adsorption roller 140 and the first drying space S1, a region between the first drying space S1 and the first-first moving roller 160, and a region between the second adsorption roller 190 and the second drying space S2. Also, the first sub-assembly 100 may further include meandering control members A which prevent the membrane 2 from meandering and are respectively provided in an upstream region of the first adsorption roller 140 and a region between the first-first moving roller 160 and the second adsorption roller 190. Also, the first sub-assembly 100 may further include: a calculation member (not shown) capable of calculating the total length of the film F on the basis of the moving speed of the membrane 2; a control member (not shown) for controlling the rotation speeds and adsorption pressures of the first and second adsorption rollers 140 and 190; and a vision inspection member (not shown) for checking the application states of the first electrode catalyst 3 and the second electrode catalyst 4.

The second sub-assembly 200 may include: a second-first moving roller 210 movable along a predetermined trajectory; and a second-first controller 220 controlling movement of the second-first moving roller 210. For example, the second-first moving roller 210 may move in the up-down direction along a predetermined trajectory formed in the up-down direction, and the second-first controller 220 may control the up-down directional movement of the second-first moving roller 210.

According to the present disclosure, when the second-first moving roller 210 moves along the predetermined trajectory, a moving speed of the membrane 2 in the upstream region of the second-first moving roller 210 may be controlled to be different from a moving speed of the membrane 2 in the downstream region of the second-first moving roller 210. For example, in a case where the second-first moving roller 210 is provided as illustrated in FIG. 1, when the second-first moving roller 210 moves in the upward direction, the length of the membrane 2 in the vicinity of the second-first moving roller 210 is increased. Thus, the moving speed of the membrane 2 in the downstream region of the second-first moving roller 210 becomes less than the moving speed of the membrane 2 in the upstream region of the second-first moving roller 210. On the other hand, when the second-first moving roller 210 moves in the downward direction, the length of the membrane 2 in the vicinity of the second-first moving roller 210 is reduced. Thus, the moving speed of the membrane 2 in the downstream region of the second-first moving roller 210 becomes greater than the moving speed of the membrane 2 in the upstream region of the second-first moving roller 210. Thus, according to the present disclosure, the feed rate of the membrane 2 may be adjusted by controlling the movement of the second-first moving roller 210.

Meanwhile, according to the present disclosure, a plurality of second-first moving rollers 210 may be provided along a direction in which the membrane 2 moves. As one example, the plurality of second-first moving rollers 210 may be provided along the left-right direction. FIG. 1 illustrates, as one example, a state in which two second-first moving rollers 210 are provided along the left-right direction. However, unlike that illustrated in FIG. 1, only one second-first moving roller 210 may be provided.

Meanwhile, the second sub-assembly 200 may further include a second dryer 230 that sprays air for drying. More specifically, the second dryer 230 may be configured to additionally dry the membrane-electrode joined body 6 supplied from the first sub-assembly 100 by spraying hot air for drying the membrane-electrode joined body 6.

Meanwhile, the second sub-assembly 200 may further include fixed rollers R which are respectively provided in a region between the first sub-assembly 100 and the second-first moving roller 210, a region between the plurality of second-first moving rollers 210, and a region between the second-first moving roller 210 and the third sub-assembly 300.

Continuing to refer to FIG. 1, the third sub-assembly 300 may include a heat-pressing part 310 which heats or presses the membrane-electrode joined body 6. More preferably, the heat-pressing part 310 may heat and press the membrane-electrode joined body 6.

According to an exemplary embodiment of the present disclosure, the heat-pressing part 310 may include a plurality of pressing rollers. Thus, according to the exemplary embodiment of the present disclosure, the membrane-electrode joined body 6 flows into the plurality of pressing rollers provided in the heat-pressing part 310, and is then heated and pressed by the pressing rollers. Accordingly, adhesion force within the membrane-electrode joined body 6 may be improved.

More specifically, according to the exemplary embodiment of the present disclosure, the heat-pressing part 310 may include: a third-first pressing roller 311 that faces one surface of the membrane-electrode joined body 6; and a third-second pressing roller 312 that faces the third-first pressing roller 311 with the membrane-electrode joined body 6 therebetween. FIG. 1 illustrates a state in which the third-second pressing roller 312 is provided above the third-first pressing roller 311. The third-first pressing roller 311 faces the bottom surface of the membrane-electrode joined body 6, and the third-second pressing roller 312 faces the top surface of the membrane-electrode joined body 6. Here, the third-second pressing roller 312 is configured to rotate by directly receiving power, but the third-first pressing roller 311 may be configured to be freely rotatable according to the rotation of the third-second pressing roller 312 without separately receiving power.

Meanwhile, according to the exemplary embodiment of the present disclosure, the heat-pressing part 310 may further include a third-third pressing roller 313 that faces the third-second pressing roller 312 with the membrane-electrode joined body 6 therebetween. FIG. 1 illustrates a state in which the third-third pressing roller 313 is provided above the third-second pressing roller 312. Similar to the third-second pressing roller 312, the third-third pressing roller 313 may be configured to rotate by directly receiving power.

Also, according to the exemplary embodiment of the present disclosure, the heat-pressing part 310 may further include: a third-fourth pressing roller 314 that faces the third-third pressing roller 313; a third-fifth pressing roller 315 that faces the third-second pressing roller 312; and a third-sixth pressing roller 316 that faces the third-first pressing roller 311. FIG. 1 illustrates a state in which the third-fourth pressing roller 314 is provided on the right side of the third-third pressing roller 313, the third-fifth pressing roller 315 is provided on the right side of the third-second pressing roller 312, and the third-sixth pressing roller 316 is provided on the right side of the third-first pressing roller 311. Here, the third-fourth pressing roller 314 and the third-fifth pressing roller 315 are configured to rotate by directly receiving power, but the third-sixth pressing roller 316 may be configured to be freely rotatable according to the rotation of the third-fifth pressing roller 315 without separately receiving power.

That is, based on the above description, the membrane-electrode joined body 6 may be heated and pressed while sequentially passing through a space between the third-first pressing roller 311 and the third-second pressing roller 312, a space between the third-second pressing roller 312 and the third-third pressing roller 313, a space between the third-third pressing roller 313 and the third-fourth pressing roller 314, a space between the third-fourth pressing roller 314 and the third-fifth pressing roller 315, and a space between the third-fifth pressing roller 315 and the third-sixth pressing roller 316.

According to the present disclosure, when the plurality of pressing rollers are provided in the heat-pressing part 310, the membrane-electrode joined body 6 may be continuously heated and pressed while the plurality of pressing rollers rotate. Thus, the continuity between processes may be ensured.

Figure 2:
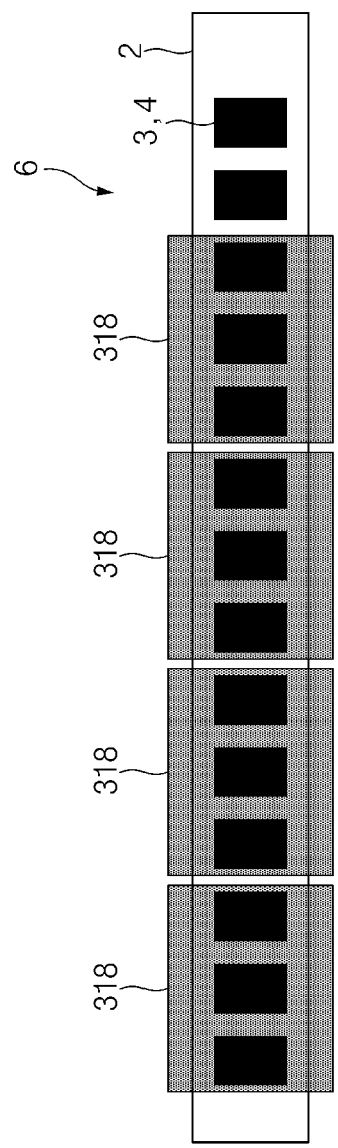
FIG. 2 is a view illustrating a state in which a membrane-electrode joined body is pressed by a heat-pressing part provided in a device for manufacturing a membrane-electrode gasket assembly according to another exemplary embodiment of the present disclosure.

FIG. 2 is a view illustrating a state in which a membrane-electrode joined body is pressed by a heat-pressing part provided in a device for manufacturing a membrane-electrode gasket assembly according to another exemplary embodiment of the present disclosure.

According to another exemplary embodiment of the present disclosure, unlike the exemplary embodiment of the present disclosure, a heat-pressing part 310 may include a press member 318 that presses the membrane-electrode joined body 6 while moving in the up-down direction. For example, a plurality of press members 318 may be provided along a direction in which the membrane-electrode joined body 6 is conveyed. FIG. 2 illustrates a state in which four press members 318 are provided along the direction in which the membrane-electrode joined body 6 is conveyed.

Meanwhile, referring to FIG. 1 again, the third sub-assembly 300 according to the present disclosure may further include: a gasket unwinder 320 supplying a film F on which a gasket 5 is attached; a third film rewinder 330 collecting the film F from the gasket 5; a gasket cutter 340 provided between the gasket unwinder 320 and the third film rewinder 330 and cutting the gasket 5; and an assembler 350 which is provided in a region downstream from the heat-pressing part 310, and which manufactures an assembly 7 by pressing and joining the membrane-electrode joined body 6 and the gasket 5 together. FIG. 1 illustrates a state in which the gasket unwinder 320, the third film rewinder 330, and the gasket cutter 340 are symmetrically provided on the upper and lower sides of the assembler 350.

Here, the assembler 350 may include: a first joining member 352 pressing the membrane-electrode joined body 6 and the gasket 5 so as to form a first joined region in the assembly 7; and a second joining member 354 pressing the membrane-electrode joined body 6 and the gasket 5 so as to form a second joined region in the assembly 7. Here, the first joined region and the second joined region may represent a region in which the membrane-electrode joined body 6 and the gasket 5 are attached to each other.

Here, according to the present disclosure, the first joined region may be different from the second joined region. Between the first joined region and the second joined region, there may be a region in which the first joined region and the second joined region overlap each other. On the other hand, there may be no region in which the first joined region and the second joined region overlap each other.

For example, when a direction in which the assembly 7 or the membrane-electrode joined body 6 is conveyed is referred to as a front-rear direction, the first joining member 352 may press a front region or a rear region of the gasket 5, and the second joining member 354 may press a left region or a right region of the gasket 5.

Meanwhile, the third sub-assembly 300 may further include a meandering control member A which is provided in a downstream region of the gasket unwinder 320 and prevents the gasket 5 from meandering.

Also, although not illustrated in the drawing, the manufacturing device 10 according to the present disclosure may further include a drying member provided on one side of the first adsorption roller 140 or the second adsorption roller 190 (for example, provided above the first adsorption roller 140 or the second adsorption roller 190). Thus, according to the present disclosure, a drying operation may be performed by the drying member separately from the first dryer 150 right after the first electrode catalyst 3 or the second electrode catalyst 4 is applied to the membrane 2 through the first slot die 130 or the second slot die 180.

Also, although not illustrated in the drawing, the manufacturing device 10 according to the present disclosure may further include a moving roller provided between the heat-pressing part 310 and the assembler 350. Thus, according to the present disclosure, the rate, at which the membrane-electrode joined body 6 discharged from the heat-pressing part 310 is supplied to the assembler 350, may be adjusted separately from the second-first moving roller 210.

According to the present disclosure, it is possible not only to ensure the continuity between the processes by integrating the operations performed to manufacture the membrane-electrode gasket assembly, but also to prevent the quality of the membrane-electrode gasket assembly from being deteriorated.

The present disclosure provide not only for ensuring continuity between processes by integrating operations performed to manufacture a membrane-electrode gasket assembly, but also for preventing the quality of the membrane-electrode gasket assembly from being deteriorated.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A device for manufacturing a membrane-electrode gasket assembly, the device comprising:
   a first sub-assembly configured to manufacture a membrane-electrode body having a membrane and an electrode catalyst being joined to each other;
   a second sub-assembly provided downstream from the first sub-assembly and being configured to receive the membrane-electrode body from the first sub-assembly, the second sub-assembly comprising a second moving roller capable of moving in an up-down direction; and
   a third sub-assembly provided downstream from the second sub-assembly, the third sub-assembly being configured to receive the membrane-electrode body from the second sub-assembly and to manufacture an assembly by joining a gasket to the membrane-electrode joined body,
   wherein the membrane is disposed continuously over the first to third sub-assemblies,
   wherein the third sub-assembly comprises a heat-pressing part configured to heat or press the membrane-electrode body,
   wherein the heat-pressing part comprises:
      a first pressing roller facing one surface of the membrane-electrode body;
      a second pressing roller facing the first pressing roller with the membrane-electrode body therebetween;
      a third pressing roller facing the second pressing roller with the membrane-electrode body therebetween,
   wherein the second pressing roller is disposed above the first pressing roller, and the third pressing roller is disposed above the second pressing roller, wherein the heat-pressing part further comprises:
a fourth pressing roller that faces the third pressing roller;
a fifth pressing roller that faces the second pressing roller; and
a sixth pressing roller that faces the first pressing roller,
wherein the fourth pressing roller is provided on a right side of the third pressing roller,
wherein the fifth pressing roller is provided on a right side of the second pressing roller,
wherein the sixth pressing roller is provided on a right side of the first pressing roller,
wherein the first sub-assembly comprises:
a first slot die being configured to apply a first electrode catalyst to a surface of the membrane;
a first dryer configured to dry the membrane and the first electrode catalyst; and
a second slot die being configured to apply a second electrode catalyst to the other surface of the membrane,
wherein the first dryer comprises:
a drying body:
a first drying space formed in the drying body, wherein the membrane and the first electrode catalyst are configured to flow into the first drying space; and
a second drying space formed in the drying body, wherein the membrane, the first electrode catalyst, and the second electrode catalyst are configured to flow into the second drying space,
wherein the first drying space and the second drying space are spaced apart from each other in the up-down direction inside the drying body, and
wherein the first drying space and the second drying space are configured to be in an overlapping state when the first dryer is viewed from the above,
wherein the third sub-assembly comprises an assembler provided downstream from the heat-pressing part, the assembler being configured to press and join the membrane-electrode body and the gasket,
wherein the assembler comprises:
a first joining member configured to press the membrane-electrode body and the gasket to form a first joined region in the membrane-electrode gasket assembly; and
a second joining member configured to press the membrane-electrode body and the gasket so as to form a second joined region in the membrane-electrode gasket assembly, wherein the first joined region is different from the second joined region,
wherein a direction in which the membrane-electrode gasket assembly is conveyed is referred to as a front-rear direction, the first joining member presses a front region or a rear region of the gasket, and
wherein the second joining member presses a left region or a right region of the gasket.

2. The device of claim 1, wherein the first sub-assembly comprises:
a membrane unwinder configured to supply a film to which the membrane is attached;
a first film rewinder provided downstream from the membrane unwinder and being configured to collect the film from the membrane; and
a first adsorption roller facing the first slot die and being configured to cause adsorption in the membrane,
wherein the first slot die is provided downstream from the first film rewinder.

3. The device of claim 2, wherein the first drying space is provided downstream from the first adsorption roller.

4. The device of claim 3, wherein the first sub-assembly further comprises:
a first moving roller provided downstream from the first drying space and movable along a predetermined trajectory; and
a first controller configured to control movement of the first moving roller.

5. The device of claim 4, wherein the first sub-assembly further comprises:
a second adsorption roller facing the second slot die and being configured to cause adsorption in the membrane, and
wherein the second slot die is provided downstream from the first moving roller.

6. The device of claim 5, wherein the second drying space is provided downstream from the second adsorption roller.

7. The device of claim 4, wherein the first moving roller is movable in a left-right direction.

8. The device of claim 1, wherein the second sub-assembly further comprises:
a second controller configured to control movement of the second moving roller.

9. The device of claim 8, wherein a plurality of second moving rollers are provided along a direction in which the membrane moves.

10. The device of claim 8, wherein the second sub-assembly further comprises a second dryer configured to spray air for drying.

11. The device of claim 1, wherein the third sub-assembly further comprises:
a gasket unwinder configured to supply a film on which the gasket is attached;
a third film rewinder configured to collect the film from the gasket; and
a gasket cutter provided between the gasket unwinder and the third film rewinder and configured to cut the gasket.

12. The device of claim 1, wherein the heat-pressing part comprises a press member configured to move in an up-down direction and to press the membrane-electrode body.

* * * * *